United States Patent [19]
van der Lely

[11] 4,279,310
[45] Jul. 21, 1981

[54] SOIL WORKING MACHINE

[76] Inventor: Cornelis van der Lely, 7, Brüschenrain, Zug, Switzerland

[21] Appl. No.: 73,860

[22] Filed: Sep. 10, 1979

[30] Foreign Application Priority Data

Sep. 28, 1978 [NL] Netherlands ............... 7809814

[51] Int. Cl.³ ............... A01B 33/02; A01B 33/08; A01B 33/10; A01B 33/14
[52] U.S. Cl. ............... 172/47; 172/49; 172/68; 172/125; 172/555
[58] Field of Search ............ 172/52, 125, 47–49, 172/55, 56, 118–123, 540, 543, 547–550, 552, 553, 555, 556

[56] References Cited

U.S. PATENT DOCUMENTS

| | | | |
|---|---|---|---|
| 196,617 | 10/1877 | Adams | 172/52 X |
| 278,803 | 6/1883 | Lillie | 172/48 |
| 381,464 | 4/1888 | Crane | 172/49 X |
| 980,484 | 1/1911 | Bradley | 172/52 |
| 2,908,337 | 10/1959 | Surprise et al. | 172/125 X |
| 2,943,687 | 7/1960 | Merry et al. | 172/125 |
| 3,437,061 | 4/1969 | Wells | 172/123 X |
| 3,937,285 | 2/1976 | Lely | 172/52 |
| 4,003,439 | 1/1977 | Lely | 172/125 X |

FOREIGN PATENT DOCUMENTS

| | | | |
|---|---|---|---|
| 328115 | 10/1920 | Fed. Rep. of Germany | 172/49 |
| 438698 | 12/1926 | Fed. Rep. of Germany | 172/125 |
| 542586 | 12/1956 | Italy | 172/123 |

*Primary Examiner*—Paul E. Shapiro
*Attorney, Agent, or Firm*—Mason, Mason and Albright

[57] ABSTRACT

A soil working machine has at least one, preferably two rotors, one of which is at a higher working level than the other to achieve a relatively large working depth. The rotors are driven through a drive gear transmission located about midway along the length of the rotors. An adjustable coupling of the machine can be used to establish either one of two positions which are offset about an axis which extends transverse to the normal direction of travel. The transmission includes change speed gears in a first gear box for connection to a tractor p.t.o. and an output of the transmission is geared to a gear wheel housed in a flat gear box, the gear wheel being in driving engagement with pinions on the rotor shafts. The entire frame can be rotated to a limited extent relative to the transmission gear box owing to a flange connection between the two gear boxes and a setting device for their relative positions to one another.

29 Claims, 8 Drawing Figures

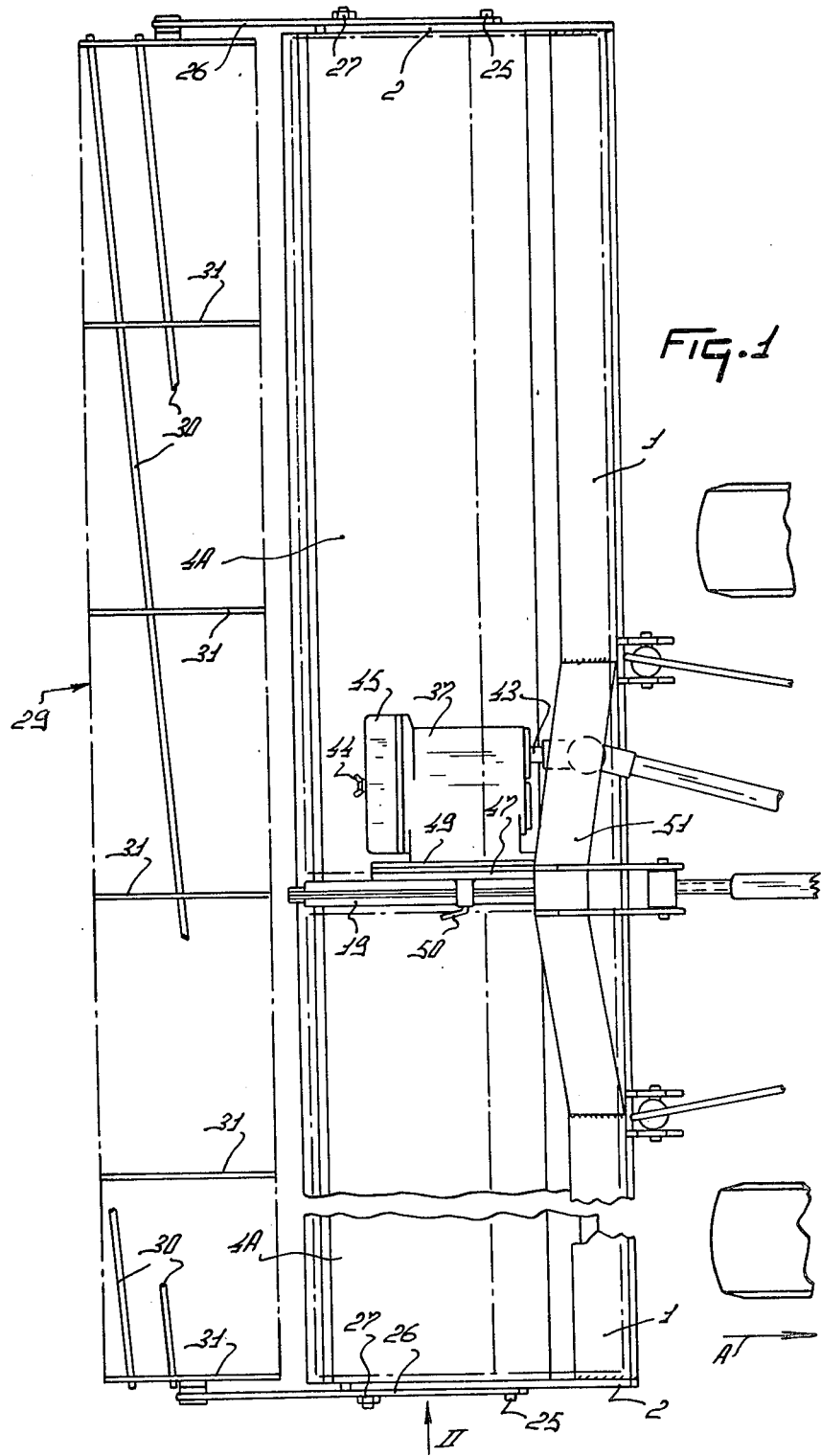

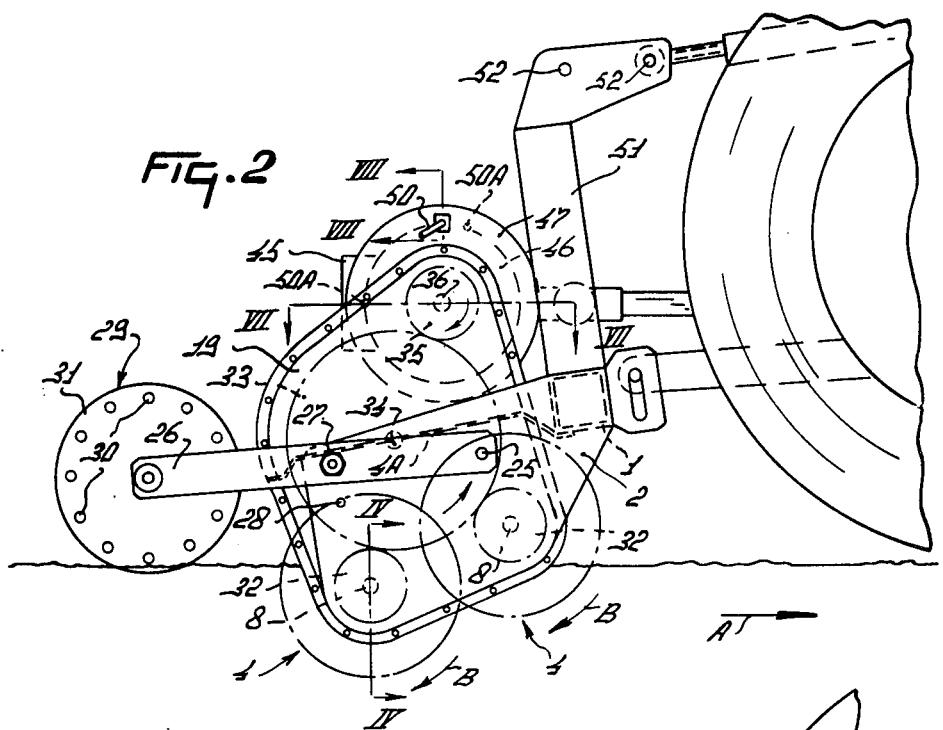
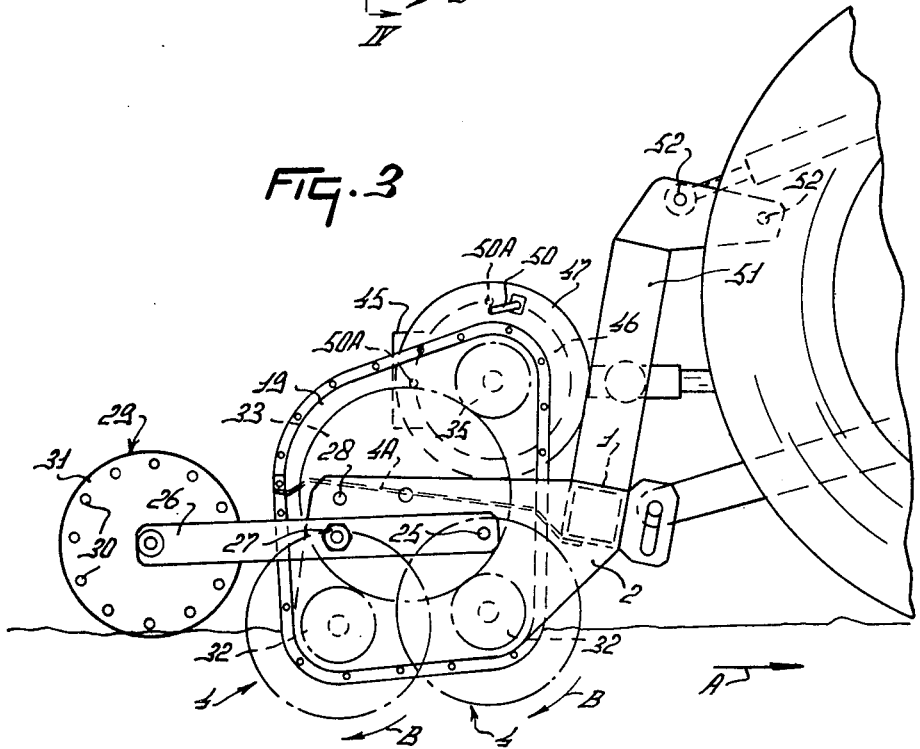

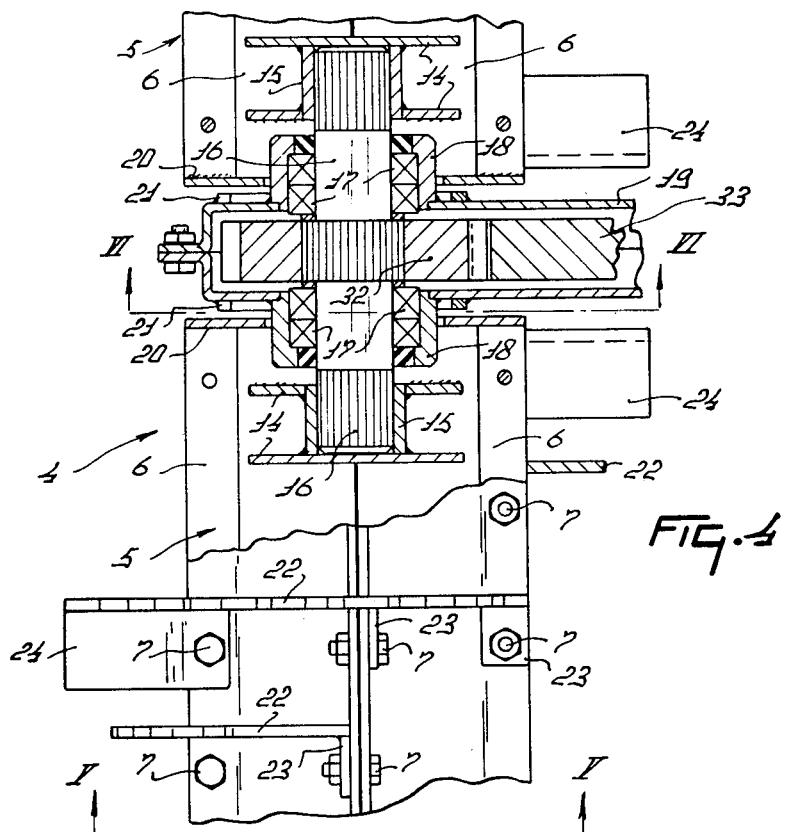
FIG. 4
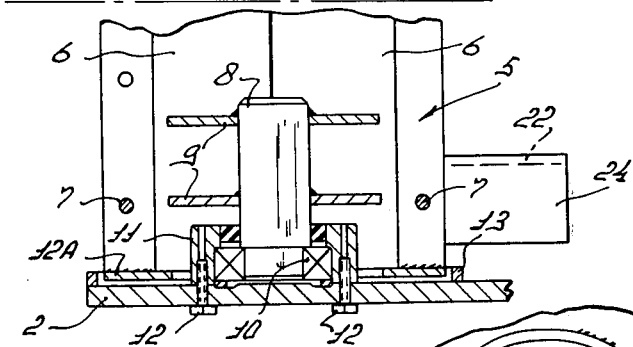
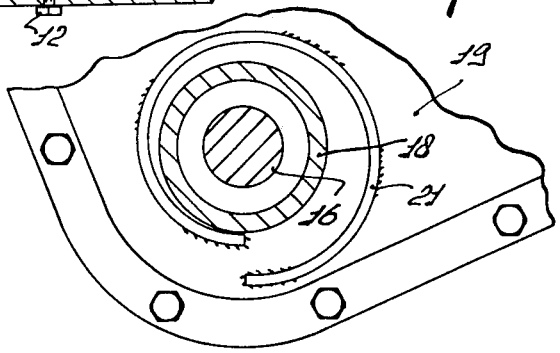
FIG. 6

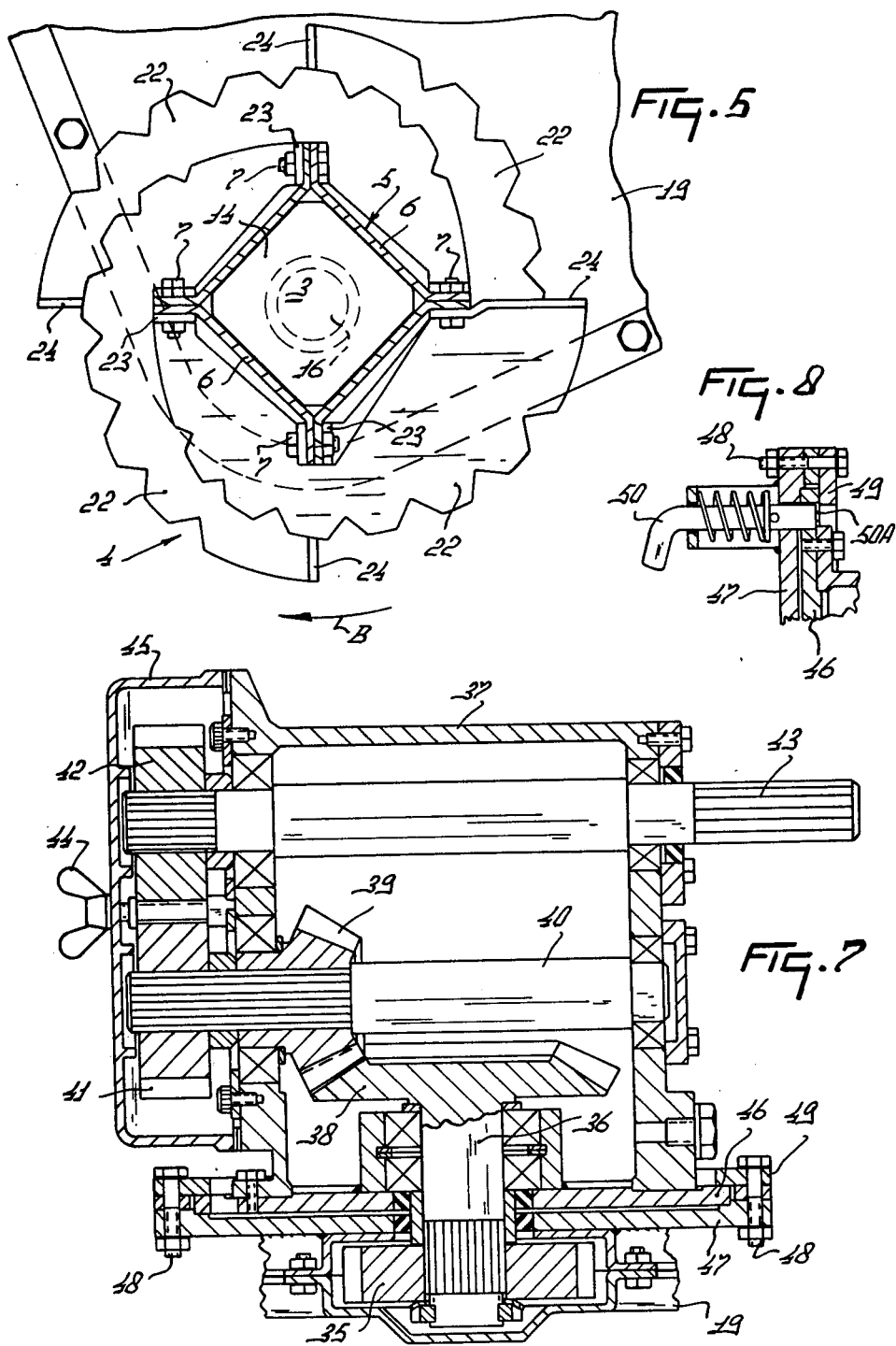

SOIL WORKING MACHINE

According to a first aspect of the present invention there is provided a soil working machine comprising a frame and at least two rotors, provided with soil working members, journalled in the frame for rotation about a substantially horizontal axis extending transversely of the intended direction of operative travel of the machine, the two rotors being at different vertical levels to one another and the paths of the working members of one of the rotors overlap the paths of the working members of the other rotor.

According to a second aspect of the present invention there is provided a soil working machine comprising a frame and a rotor which is rotatable about a substantially horizontal axis extending transversely of the intended direction of operative travel of the machine and which is provided with soil working members, the machine frame being provided with coupling means by which the machine can be set in at least two positions with respect to a tractor to which the machine is coupled.

According to a third aspect of the present invention there is provided a soil working machine comprising a frame, and a rotor mounted in the frame for rotation about a substantially horizontal axis extending transversely of the intended direction of operative travel of the machine, driving gear being provided for the rotor, this driving gear comprising a gear box which can be set in either one of at least two positions relative to the machine frame.

For a better understanding of the present invention and to show how it may be carried into effect, reference will now be made, by way of example only, to the accompanying drawings in which:

FIG. 1 is a plan view of a soil working machine;

FIG. 2 is a view in the direction of the arrow II in FIG. 1;

FIG. 3 is a view corresponding to FIG. 2 with the machine in a different operative position;

FIG. 4 is an enlarged view taken on the line IV—IV in FIG. 2;

FIG. 5 is a view taken on the line V—V in FIG. 4;

FIG. 6 is a view taken on the line VI—VI in FIG. 4;

FIG. 7 is an enlarged view taken on the line VII—VII in FIG. 2, and

FIG. 8 is an enlarged view taken on the line VIII—VIII in FIG. 2.

The construction illustrated in the Figures is a soil working machine comprising a frame beam 1, extending transversely of the intended direction A of operative travel of the machine. At its ends, the frame beam 1 has vertical plates 2 extending rearwardly and parallel to the direction A. These plates 2 are generally rectangular as shown in FIGS. 2 and 3 and have at the front an edge which is inclined forwardly from bottom to top. Carriers 3, one for each of two rotors 4, are mounted at different heights between the plates 2. The rotary axis of each rotor 4 coincides with the longitudinal centerline of its carrier 3 (FIG. 5) and extends, generally horizontally, transversely of the direction A. Each carrier 3 comprises two identical aligned parts 5. Each part 5 is a hollow member of square cross section and is built up from four identical plates 6, the longitudinal edge regions of which are bent out of the plane of the rest of the plate and are clamped together by bolts 7. The clamped longitudinal edge regions of the respective plates 6 project radially as ribs extending lengthwise of the carrier parallel to its longitudinal centerline. At the outer ends of the two parts 5 of each carrier there are stub shafts 8, each of which is mounted in supports 9 inside its part 5 (FIG. 4). Each stub shaft 8 is supported by a bearing 10 in a housing 11, which is fastened by bolts 12 to the adjacent plate 2. The outer end of each part 5 is provided with a flange 12A located inside a protective ring 13 on the plate 2. At the inner end of each part 5, a hub 15 is mounted on supports 14 within the part 5. The hubs 15 of the two parts 5 of each carrier 3 fit over the splined end of a common shaft 16, which is supported by bearings 17 in a bearing housing 18. Each bearing housing 18 is secured in the walls of a flat gear box 19, located between the inner ends of the carrier parts 5. The inner ends of the parts 5 are closed by flanges 20. Opposite each of the flanges 20 the wall of the gear box 19 is provided with a scraping member 21 extending spirally outwards from the shaft 16. This scraping member prevents earth from accumulating between the rotating carrier parts 5 and the gear box 19 during operation (FIG. 6). Soil working members 22 are fastened to each of the carrier parts 5 of each rotor 4.

The working members 22 are fastened to the carrier parts 5 by the bolts 7 and the ribs formed by the longitudinal edge regions of the plates 6. Each working member 22 is punched from sheet material of a thickness of, preferably, about 6 mms. The outer circumference of each working member 22 formed by the edge away from the carrier 3 is substantially in the form of an involute and subtends a circumferential angle of about 180°. The leading edge of the outer circumference of each working member 22, with respect to the intended direction B of operative rotation of the rotor is nearer to the rotary axis of the rotor than is the substantially radially extending trailing edge. Before taking up the involute form, the leading edge extends from the point where it meets the carrier at least substantially tangentially with respect to the rotary axis of the rotor. The radial width of the working member 22 at the front is one sixth of the width at the rear. At the inner periphery, which faces the carrier 3, each working member 22 is provided with fastening portions 23 which are perpendicular to the plane of the rest of the working member and are spaced apart by circumferential angles of about 90°, these fastening portions being secured by the bolts 7 to the ribs formed by the longitudinal edge regions of the plates 6. At the rear, the working member 22 is fastened by one end of a straight rim 24 projecting at right angles to the plane of the working member radially along the width of the working member. Between the fastening portions each working member 22 has a recess. When the working member is mounted the edge of the recess between the foremost and central fastening portions is substantially parallel to the adjacent plate of the carrier and the edge of the recess between the central and hindmost fastening portions is inclined towards the adjacent plate 6 from front to rear. The outer periphery of each working member 22 has serrations formed by a plurality of spaced V-shaped recesses, the depth and width of which increase from front to rear. The positions of these recesses are such that a line passing through the tip of the V and a point midway between the outer sides of the V extends substantially radially. Viewed along the carrier 3, consecutive working members 22 are off-set by about 90° from one another so that they overlap one another by one third of their total surface. The distance between consecutive working members 22 is substantially equal to the width of the rim 24 which serves as a blade. The diameter of each rotor 4 comprising the carrier 3 and its working members 22 is about 30 cms and its working width is about 3 meters. When the top edges of the plates 2 are horizontal, the leading rotor is about 10 cms higher than the trailing rotor. Above the rotors 4 there is a hood 4A.

The plates 2 are provided with stub shafts 25 on which arms 26, extending rearwardly along the plates, can turn. These arms 26 can be set in either one of two positions by means of a bolt 27 and two holes 28 in the plate. Between the ends of the arms 26 there is a supporting member constructed in the form of a freely rotatable roller 29. At the circumference the roller 29 has helically extending, elongate elements 30, these being supported by support plates 31.

In the gear box 19, the shafts 16 of the rotors 4, to which shafts the adjacent ends of the carrier parts 5 are fastened, are each provided with a spur pinion 32, the two pinions 32 being drivably in mesh with an overlying common large gear wheel 33 mounted on a shaft 34 journalled in the walls of the gear box. In operation the rotors 4 are driven in the same sense. At the top, the large gear wheel 33 is drivably in mesh with a pinion 35, which is identical to the pinions 32. The gear wheel 35 is fixed on a shaft 36 projecting from the gear box 19 into a second gear box 37. Inside this gear box 37, the shaft 36 is provided with a bevel pinion 38 which co-operates with a bevel pinion 39 on a shaft 40 extending parallel to the direction A and journalled in the gear box 37. The rear end of the shaft 40, with respect to the direction A, projects from the gear box 37 and is provided with a removable pinion 41, having straight teeth which co-operate with another removable pinion 42, also having straight teeth, on a shaft 43 located to the side of the shaft 40. The shaft 43 projects from the front of the gear box 37, and the projecting end portion is splined. The drivably meshing pinions 41 and 42 can be replaced one by the other and so constitute a change-speed gear. They are surrounded by a screening hood 45 secured by a wing nut 44. The gear box 37 is provided, on the side facing the flat gear box 19, with a flange 46, which is freely rotatable about the shaft 36 on bearings supporting the shaft 36. The periphery of the flange 46 is situated between a flange 47 fixed to the gear box 19 and a ring 49 clamped to the periphery of the flange 47 by bolts 48. The flange 47 is provided with a spring loaded pin 50 (FIGS. 2, 3 and 8) one end of which can be inserted into either one of two spaced apertures 50A in the flange 46 so that the gear box 37 as a whole can be set in either one of two positions. At the front, the frame beam 1 is provided with a trestle 51 for attaching the machine to the three-point lifting device of a tractor. At the top, the trestle has two openings 51 for attaching the top arm of the lifting device in two different positions so that the machine can be set in two positions, offset from each other about a transverse axis, relative to the tractor.

For operation, the machine is attached by the trestle 51 to the three point lifting device of a tractor and the shaft 43 is connected by an auxiliary shaft to the power take-off shaft of the tractor. As stated above, the machine can occupy either one of two working positions in operation, one of which is shown in FIG. 2 and the other in FIG. 3.

In FIG. 2, the roller 29 by which the working depth of the rotors 3 can be adjusted is shown in its upper position, whereas in FIG. 3, the roller is shown in its lower position. In the position shown in FIG. 3, the machine is slightly inclined forwards from bottom to top so that the trailing rotor works at a smaller depth. During a run of the machine in the direction A, the two rotors 4 are driven through the transmission described above at a speed of about 500 rev/min in the direction of the arrow B in FIGS. 2, 3 and 5. From FIGS. 2 and 3 it will furthermore be apparent that the rotors are relatively disposed so that the working members 22 of one rotor move between those of the other during operation. During operation the leading substantially tangential, non serrated portion of the outer periphery of each working member 22 is first to penetrate into the soil after which, owing to the involute form of the working member, the working member gradually penetrates further into the soil. The serrations at the outer periphery of each of the working members cause effective working of vegetal remants. Effective pulverisation of the soil is achieved by the rim 24 at the rear of the working member, which imparts to each working member the shape of a blade. To move the machine from the working position shown in FIG. 2, into the working position shown in FIG. 3, the gear box 37 is turned through about 20°, after the pin 50 has been removed, about the shaft 36 extending transversely of the direction A and is set in the position shown in FIG. 3 so that the linkage of the auxiliary shaft can be performed in substantially the same way. The gear box 37 can be set in a third position, using a third hole 50A, in which the screening hood 45 surrounding the exchangeable pinions 41 and 42 is located on the top so that exchange of the pinions can be readily performed easily without loss of lubricant.

While various features of the machine that have been described, and that are illustrated in the drawings, will be set forth in the following claims as inventive features, it is to be noted that the invention is not necessarily limited to these features and that it encompasses all of the features that have been described both individually and in various combinations.

I claim:

1. A soil working machine comprising a frame and at least two soil working rotors journalled in said frame for rotation about respective, substantially horizontal axes that extend transverse to the normal direction of travel, driving means connected to rotate said rotors, each of said rotors having corresponding soil working means, the axes of rotation of said rotors being normally positioned at different levels and located one in front of the other with respect to the direction of machine travel, the working paths of the soil working means of the forward rotor intersecting the working paths of the rear rotor, each of said two rotors comprising an elongated carrier formed by plates having interengaging longitudinal ribs and soil working members fastened to said ribs.

2. A soil working machine as claimed in claim 1, in which the working widths of said two rotors are about the same.

3. A soil working machine as claimed in claim 1, in which an inner periphery of at least one of the working members has three fastening points for attachment to said ribs.

4. A soil working machine as claimed in claim 3, in which said working members are sheet material and each member has an involute form at their peripheries.

5. A soil working machine as claimed in claim 4, in which each working member subtends a circumferential angle of about 180° and the leading edge of that member, with respect to the normal direction of rotation of the respective rotor, initially extends substantially tangentially.

6. A soil working machine as claimed in claim 5, in which the periphery of said member has serrations and the depth of said serrations increases from front to rear.

7. A soil working machine as claimed in claim 5, in which the trailing edge of at least one of said members comprises a bent-over rim.

8. A soil working machine as claimed in claim 1, in which coupling means on said frame is positioned for coupling the machine to a tractor in either one of two working positions, said positions being offset from each other about a transverse horizontal axis.

9. A soil working machine as claimed in claim 8, in which said two positions are offset from each other about an axis extending transverse to the direction of travel.

10. A soil working machine as claimed in claim 9, in which said coupling means comprises a three point attachment with two lower coupling points arranged behind a third upper point.

11. A soil working machine as claimed in claim 1, in which transmission gear means for driving at least one of said rotors is located adjacent the center of that rotor.

12. A soil working machine as claimed in claim 11, in which said one rotor comprises two aligned carrier parts interconnected by a common shaft and said shaft is part of the transmission gear means for said rotor.

13. A soil working machine as claimed in claim 1, in which said gear means comprises a respective pinion on the shaft extending between the carrier parts of each rotor, said pinion being in driving engagement with an overlying larger gear wheel, said rotors being driven in the same direction.

14. A soil working machine as claimed in claim 13, in which said gear wheel is drivably in mesh with a further pinion positioned at the upper portion of said wheel, said further pinion having a diameter equal to those of the respective pinions of said rotors.

15. A soil working machine comprising a frame and at least two soil working rotors journalled in said frame for rotation about respective, substantially horizontal axes that extend transverse to the normal direction of travel, driving means connected to rotate said rotors, each of said rotors having corresponding soil working means, means for adjusting the axes of rotation of said rotors to at least two different working levels, the axes of said rotors being located one in front of the other with respect to the direction of machine travel, transmission gear means for driving at least one of said rotors and said gear means including a gear box that houses a transmission, and means for displacing and setting said box in either one of two settings that correspond to the different working levels.

16. A soil working machine as claimed in claim 15, in which said two rotors are driven from a common gear wheel of said gear means.

17. A soil working machine comprising a frame and at least one elongated soil working rotor journalled in said frame for rotation about a substantially horizontal axis that extends transverse to the direction of travel, driving means connected to rotate said rotor and work the soil, said driving means including a driving gear transmission housed in a gear box and said transmission being in driving engagement with a pinion on a shaft that defines the axis of rotation of said rotor, said rotor being operatively positionable at two working levels and said gear box displaceable about a horizontal axis and settable to match each of said working levels.

18. A soil working machine as claimed in claim 17, in which said gear box is pivotable about a pivotal axis extending transverse to the direction of machine travel.

19. A soil working machine as claimed in claim 18, in which said pivotal axis extends substantially parallel to the rotary axis of said rotor.

20. A soil working machine as claimed in claim 19, in which said pivotal axis is located above said rotor.

21. A soil working machine as claimed in claim 20, in which said pivotal axis coincides the axis of an output shaft of said gear box.

22. A soil working machine as claimed in claim 21, in which said gear box is pivotable through an angle of about 20° between two settings.

23. A soil working machine as claimed in claim 18, in which the gear box houses two exchangeable pinions that co-operate with one another as a change-speed gear arrangement, said two pinions being in driving engagement with said rotor.

24. A soil working machine as claimed in claim 23, in which said gear box can be pivoted out of a working position through about 90° into a position in which the two pinions are accessible from the top of said gear box.

25. A soil working machine as claimed in claim 17, in which the transmission is located adjacent the center of said rotor and in driving engagement with a gear wheel in a flat gear box adjacent said first mentioned gear box, said wheel being in mesh with said pinion on the rotor shaft.

26. A soil working machine as claimed in claim 25, in which said flat gear box mounts scraping means for removing adhering earth and said scraping means is located adjacent rotating parts of said rotor.

27. A soil working machine as claimed in claim 26, in which said scraping means comprises a helical part.

28. A soil working machine comprising a frame and at least one elongated soil working rotor journalled in said frame for rotation about a substantially horizontal axis that extends transverse to the direction of travel, driving means connected to rotate said rotor and work the soil, said driving means including a driving gear transmission housed in a gear box and said transmission being in driving engagement with a pinion on a shaft that defines the axis of rotation of said rotor, said pinion being mounted intermediate the ends of said rotor and being in mesh with a gear wheel housed in a second gear box, said gear wheel being driven by said transmission and the latter being connected to an input, the second gear box being connected to said first mentioned gear box via rotatable flange means and setting means fixing the two gear boxes in a plurality of different relative settings that correspond to the working levels of said rotor.

29. A soil working machine as claimed in claim 28, in which there are two rotors that mount respective shafts with pinions and said pinions are in mesh with said gear wheel, said rotors being spaced apart one before the other and positionable in different working positions, means adjusting the relative working level of one rotor to the other.

* * * * *